United States Patent [19]

Tanaka et al.

[11] Patent Number: 4,630,926
[45] Date of Patent: Dec. 23, 1986

[54] FINE CLEARANCE MEASURING APPARATUS

[75] Inventors: Katsuyuki Tanaka; Seiichiroo Terashima; Yoshinori Takeuchi; Toshiko Odaka, all of Ibaraki; Yokuo Saito, Kanagawa, all of Japan

[73] Assignee: Hitachi, Ltd., Tokyo, Japan

[21] Appl. No.: 633,274

[22] Filed: Jul. 23, 1984

[30] Foreign Application Priority Data

Dec. 21, 1983 [JP] Japan ................................. 58-239732

[51] Int. Cl.⁴ ............................................... G01B 9/02
[52] U.S. Cl. .................................... 356/357; 356/359
[58] Field of Search ........................ 356/357, 359, 363

[56] References Cited

U.S. PATENT DOCUMENTS 4,159,522  6/1979  Zanoni ........................... 356/345 X

OTHER PUBLICATIONS

Bowen, "Interferometer Alignment Tool", *IBM Tech. Diclos. Bulletin*, vol. 15, No. 12, pp. 3691–3692, 5/73.
Lin et al., "An Application of White Light Interferometry in Thin Film Measurements", *IBM Journal of Research and Development*, vol. 16, No. 3, pp. 269–276.

Primary Examiner—Davis L. Willis
Assistant Examiner—Matthew W. Koren
Attorney, Agent, or Firm—Antonelli, Terry & Wands

[57] ABSTRACT

One of two articles arranged to form a fine clearance therebetween is made of a transparent material through which a light flux is impinged to the other article to form a reflection light which includes an interference fringe pattern information representing the fine clearance between the two articles. The reflection light is focused on a photo-electric conversion plane and converted to an electrical signal. The photo-electrically converted interference fringe pattern information is then converted to digital information, which is stored in a frame memory. A computer reads out the digital information from the frame memory and determines peak positions of light and/or dark areas of the interference fringe to measure the fine clearance between the two articles.

10 Claims, 13 Drawing Figures

FINE CLEARANCE MEASURING APPARATUS

BACKGROUND OF THE INVENTION

The present invention relates to an apparatus for measuring a fine clearance between two articles, and more particularly to a measuring apparatus for precisely measuring a spacing of a magnetic head of a magnetic disc unit.

As an example of measurement of a fine clearance, the measurement of the spacing of the magnetic head of the magnetic disc unit is explained. The magnetic head assembly floats on a surface of a magnetic disc (information record medium) rotating at a high speed while keeping a clearance (called the spacing) in the order of submicron by an aerodynamic wedge action. In order to maintain a reliability of the magnetic head assembly which maintains a small spacing in a stable manner, it is essential to detect the spacing. Since the magnetic head is mounted on a slider, a condition of the floating depends on the slider. Hereinafter, the magnetic head is referred to as the slider.

The measurement of the fine clearance (spacing) between a dummy glass disc of the magnetic disc unit and the slider by using a principle of a measuring method which utilizes a light interference method disclosed, for example, in the article "An Application of White Light Interferometry in Thin Film Measurements" by C. Lin & R. F. Sullivan, IBM J. Res. Develop., Vol. 16, No. 3 (1972), pp 269-276 is explained below.

A light from a white light source is converted by a filter into a monochromatic light flux, which is directed to a half-mirror. A portion of the light flux is directed by the half-mirror to the glass disc having an anti-reflection film coated on a surface thereof, and a portion of the incident light flux is reflected by a rear surface of the disc and the remaining portion is reflected by the surface of the slider. An interference fringe is formed by the reflection light from the surface of the slider and the reflection light from the back surface of the glass disc. The interference fringe is observed by a camera or an eye through the half-mirror.

The camera may be a Polaroid camera and a picture photographed is observed to calculated a float distance.

In the past, the positions of the interference fringe on the slider are read by direct observation or by taking a photograph to determine the spacing. This measuring method has disadvantages in that (i) it takes a large manpower and a long time, (ii) the order of the interference fringe cannot be directly determined, and (iii) precision of measurement is low. To determine the order, white light may be applied and the spacing may be determined by an interference color of the reflection light. However, this method cannot provide a high precision of measurement.

In another method, a similar interferometer is used, a spacing measurement position on the slider is previously determined by pattern position detection means, a change of an interference signal at the measurement position is detected by photo-electric conversion means while a wavelength is varied, and the float distance is determined based on the wavelength which causes a maximum or minimum electric signal. This measuring method has disadvantages in that:

(1) Since a maximum or minimum area of an interference light is spread to compare with a spot at the measuring point, it cannot be exactly related to the scanning wavelength.

(2) Since the measurement is affected by a reflection coefficient and a surface roughness of the slider, the reproducibility of the measurement is low.

(3) Since the measuring position is previously determined by the pattern position detection means, the measurement is doublefold. If the previously determined measuring position varies by a small vibration during the measurement, it is difficult to correct it. Thus, a precision of measurement is low.

In a recent magnetic disc unit, a storage capacity increases, a recording density increases, and a spacing between a magnetic head and a recording medium decreases more and more (0.3–0.45 μm). Accordingly, in order to maintain a reliability, precise and accurate measurement of the spacing and reduction of manpower and time of the measurement have become important goals.

SUMMARY OF THE INVENTION

It is an object of the present invention to provide a measuring apparatus which rapidly and precisely measures a fine clearance between two articles.

It is another object of the present invention to provide a measuring apparatus for precisely measuring a fine clearance between two articles by a computer by using coded digital signals to detect a peak of an interference fringe from an interference pattern representing the fine clearance between the two articles and to determine the orders.

It is other object of the present invention to provide a measuring apparatus which effectively reduces a noise which causes the reduction of precision of measurement and attains a high precision automatic measurement.

It is a further object of the present invention to provide a measuring apparatus which can determine a surface shape of an article based on a distribution of a fine clearance between two articles obtained by changing a wavelength of a light source for generating an interference fringe.

BRIEF DESCRIPTION OF THE INVENTION

DESCRIPTION OF THE PREFERRED EMBODIMENTS

Figure 1:
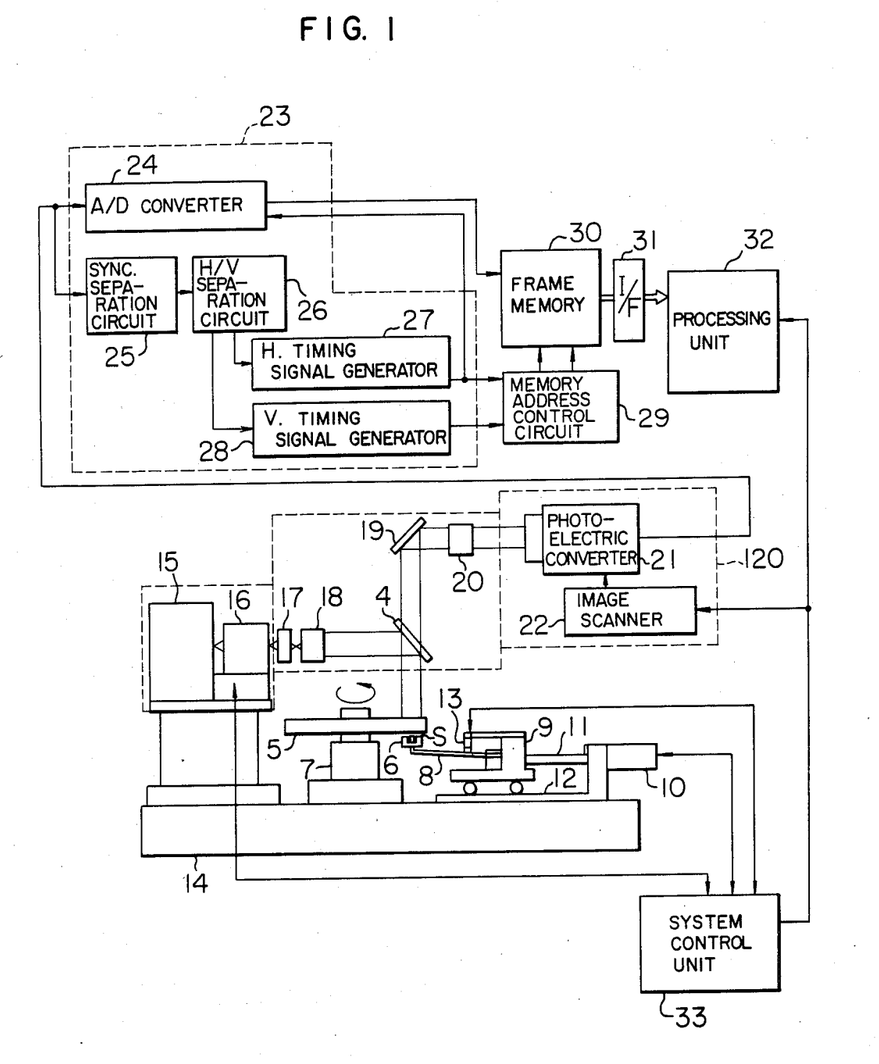
FIG. 1 shows an overall configuration of a first embodiment of the present invention.
Figure 2A:
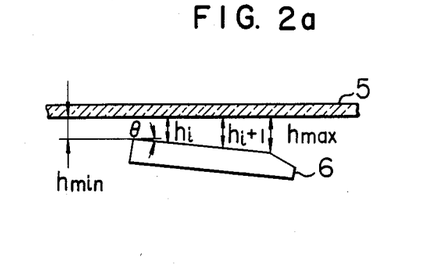
FIGS. 2a, 2b, 2c, 3a, 3b, and 3c illustrate calculation of spacing and determination of order.
Figure 2B:
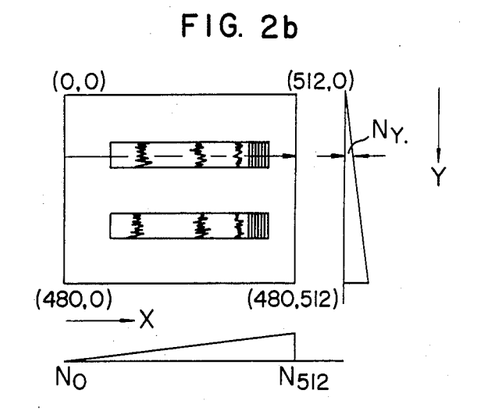
Figure 2C:
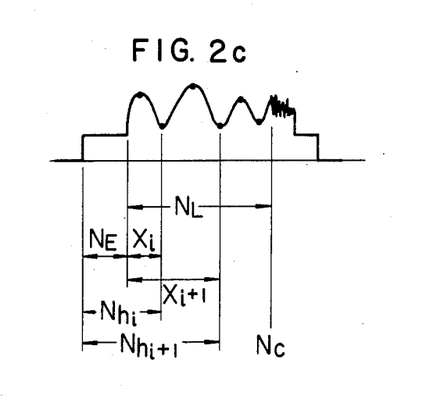
Figure 3A:
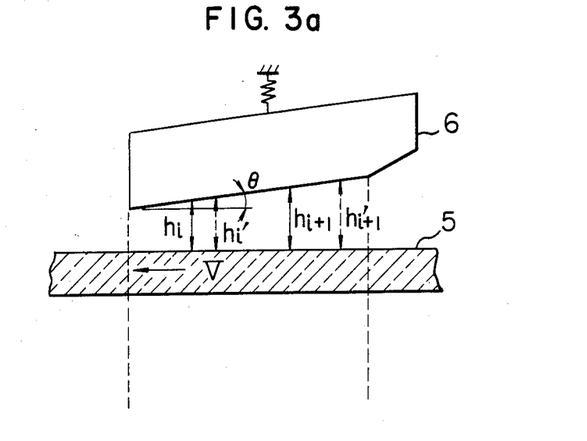
Figure 3B:
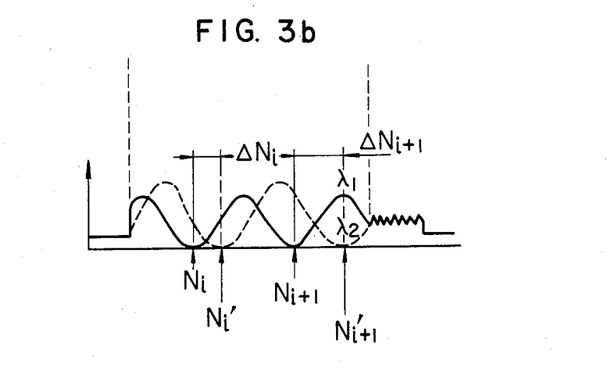
Figure 3C:
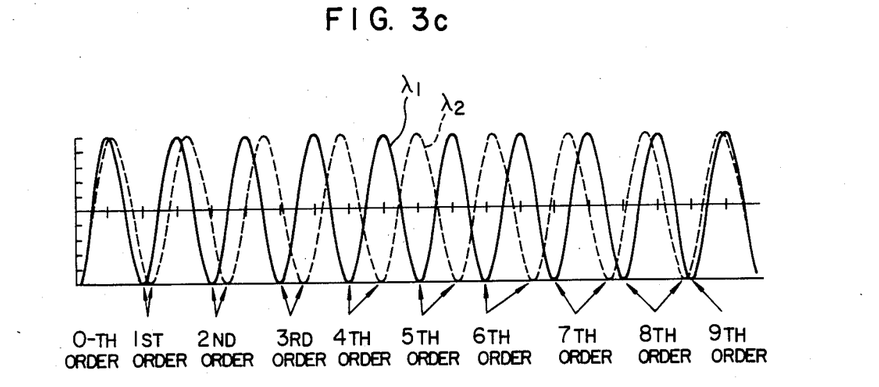

Referring to FIGS. 1, 2 and 3, a first embodiment of the present invention is explained. In FIG. 1, numeral 5 denotes a dummy transparent glass disc and numeral 6 denotes a slider. The transparent glass disc 5 is supported by a spindle 7 and rotated by a motor (not shown).

The slider 6 is supported by a support arm 8 which is fixed to a load/unload mechanism 9, which, in turn, is radially moved on a back surface of the glass disc 5 along a rail 12 by a pulse motor 10 and a lead screw 11.

During the movement of the load/unload mechanism 9, the support arm 8 is pushed down by a push-down arm 13, which is released when the slider 6 reaches a predetermined measuring point on the glass disc 5 so that the slider 6 floats on the back surface of the glass disc 5 with a fine clearance in the order of submicron therebetween.

The spindle 7 and the load/unload mechanism 9 are fixed to a base 14.

A light flux from a xenon light source 15 is applied to a monochromator 16 which emits white light or primary diffraction monochromatic light depending on a rotation angle of a diffraction grid. A light flux from the monochromator 16 passes through a flattening lens 17 and a collimeter lens 18 and is divided into two parts by a half-mirror 4.

One part of the divided light flux passes through the glass disc 5 and goes into the fine clearance or floating spacing S between the slider 6 and the glass disc 5. The light flux entered to the floating spacing S is reflected by a surface of the slider 6 and the reflected light from the slider 6 and the reflected light from the back surface of the glass disc 5 form an interference light in accordance with the float distance. This interference light is directed to the half-mirror 4.

The reflected light passes through the half-mirror 4, is deflected by a mirror 19 and applied to a lens 20 which focuses the interference pattern on a photo-electric converter 21, which scans a selected scan position by an image scanner 22 to produce an electrical signal representing the interference fringe. The photo-electric converter 21 and the image scanner 22 form a photo-electric conversion/scan unit 120. In the present embodiment, an image disector which selectively uses a conventional television scan mode and a point-to-point scan mode which repeats scan between two selected points, is used as the photo-electric conversion/scan unit 120. The photo-electric converter 21 and the image scanner 22 may be replaced by a television camera such as a solid-state imaging device or a visicon camera. An output signal from the photo-electric converter 21 is supplied to a conversion unit 23 where horizontal and vertical synchronization signals are separated for effecting discrete sampling signal processing. A synchronization separation circuit 25 separates the synchronization signals from the electric signals applied to the conversion unit 23, the horizontal synchronization signal and the vertical synchronization signal are separated by a horizontal/vertical separation circuit 26, and a horizontal timing signal and a vertical timing signal are generated by a horizontal timing signal generator 27 and a vertical timing signal generator 28, respectively. Waveforms and periods of the horizontal synchronization signal and the vertical synchronization signal may be arbitrarily selected. Thus, when the television camera is used instead of the photo-electric converter 21 and the scanner 22, only selected scan lines may be extracted from the image frame and they may be sequentially stored in an address space in a frame memory 30. When a conventional TV signal is used in the horizontal timing signal generator 27, it generates a timing pulse of 12 MHz when an effective scan period of a sawtooth wave used for the horizontal scan is divided by 512 ($2^9$). In the conventional TV signal, one horizontal line signal includes 480 effective scan lines and the timing signal is at 15.75 KHz. Accordingly, the vertical timing signal generator 28 may generate the timing pulse of 15.75 KHz. Those timing signals are applied to an A/D converter 24 as a conversion rate control signal and to a memory address control circuit 29 of a frame memory 30. The A/D converter 24 converts the video signal to a digital signal at a sampling rate of the horizontal timing signal (12 MHz). A resolution of one sample of video signal depends on a performance of the A/D converter. In the present embodiment, eight bits (256 levels) are used. An A/D converter of nine or more bits may be used. The frame memory 30 has 512×480 address spaces each having eight bits, which address spaces are controlled by the memory address control circuit 29. To store the digital video signal, the memory address control circuit 29 controls the memory address spaces to sequentially store the video signal. After all address spaces have been exhausted, the memory address control circuit 29 continues the storing from the start address or stops the storing. Assuming that the photo-electric conversion/scan unit 120 is initially in the TV scan mode, one frame of the interference pattern image is stored in the frame memory 30. The information stored in the frame memory 30 can be transferred to an external processing unit 32 through an interface circuit 31. When viewed from the processing unit 32, the memory 30 can extract any one-dimension line of the image data. Thus, the processing unit 32 extracts the 8-bit intensity data of the 512×480 address spaces as a series of one-dimension lines in a selected direction, detects an edge and a peak of the interference fringe based on those data and calculates the spacing by using the address.

Then, the photo-electric conversion/scan unit 120 is switched to the point-to-point mode to repetitively scan the interference fringe pattern data between two selected points at the normal horizontal scan period. The output signal from the photo-electric converter 21 is applied to the A/D converter 24. Since the horizontal and vertical timing signal generators 27 and 28 operate at the normal TV scan period, one scan line of interference fringe pattern data from the photo-electric converter 21 is sequentially stored in the address spaces of the frame memory 30.

A system control unit 33 effectively generates the interference fringe pattern and transfers information (wavelength, rotating speed, etc.) necessary for the calculation of the spacing to the processing unit 32.

Main functions are:

(1) To control the monochromator to control the wavelength of the monochromatic light. Also, to detect the wavelength and transfer it to the processing unit 32.

(2) To control load/unload of the slider 6 and control release of the slider push-down force.

(3) To control rotating speed of the glass disc 5.

FIGS. 2a, 2b, 2c, 3a, 3b and 3c illustrate the calculation of the spacing. A dark area of the interference fringe is explained hereinbelow although the same explanation applies to a light area.

Let us assume that intererence fringe images shown in FIG. 2b are obtained for clearances $h_i$ and $h_{i+1}$ between the glass disc 5 and the slider 6 shown in FIG. 2a and they are stored in the frame memory 30 having 512×480 address spaces, as 8-bit intensity data. A spacing at a leading edge of the slider 6 is expressed by $h_{max}$ and a spacing at a trailing edge is expressed by $h_{min}$. In the address spaces of the frame memory 30 of FIG. 2b, X-coordinate is represented by 1-512 and Y-coordinate is represented by 1-480.

Assume that the address Ny is fixed and the image is scanned in the X direction. (The Y direction need not be fixed but may be linearly changed.) FIG. 2c shows the intensity data on the memory for such scan. It corresponds to one horizontal scan line of signal, divided into 512 pixels each digitized by eight bits. This signal is processed in the following manner to detect the edge of the slider and the peak point.

(i) Define a point having a maximum intensity change to a background intensity data as an edge $N_E$.

(ii) Define points having a change rate of zero to light and dark interference signals as peak points $N_{hi}$ and $N_{hi+1}$.

(iii) Define a point having a maximum change rate of the intensity data to the leading edge, from the light and dark signal of the intererence fringe, as a slider leading edge $N_c$.

From the above, the slider edge and the peak point are determined $$\begin{cases} X_i = N_{hi} - N_E \\ X_{i+1} = N_{hi+1} - N_E \\ N_L = N_c - N_E \end{cases} \quad (1)$$

The spacing is determined by the following formulas.

$$\begin{cases} h_i = \frac{1}{2} \cdot \lambda \cdot i \, (i = 0, 1, 2 \ldots) \\ h_{i+1} - h_i = \frac{1}{2} \lambda \end{cases} \quad (2)$$

Accordingly, $$\begin{cases} h_{min} = \frac{h_i X_2 - h_{i+1} X_1}{X_2 - X_1} \\ h_{max} = h_{min} + \tan\theta \cdot N_L \end{cases} \quad (3)$$

where $\lambda$ is a wavelength, $i$ is an order and $\theta$ is an inclination angle of the slider given by the following formula $$\tan\theta = \frac{\lambda}{2(X_{i+1} - X_i)} \quad (4)$$

The determination of the order $i$ is now explained. In the clearance between the glass disc 5 and the slider 6 shown in FIG. 3a, it is determined based on a deviation between peak points of the dark areas of the interference fringes for two different wavelengths. FIG. 3b illustrates the method. Assume, for example, that $\lambda_1 = 0.40$ μm and $\mu_2 = 0.444$ μm. Since a variation of the inclination $\theta$ of the slider is small and constant, the wavelengths $\lambda_1$ and $\lambda_2$ have the following relation.

$$\begin{cases} (N_{i+1} - N_i)\tan\theta = \frac{1}{2} \lambda_1 \\ (N_{i+1}' - N_i')\tan\theta = \frac{1}{2} \lambda_2 \end{cases} \quad (5)$$

By defining $$\begin{cases} \Delta N_i = N_i' - N_i \\ N_{i+1} = N_{i+1}' - \Delta N_{i+1} \end{cases} \quad (6)$$

then $$\Delta N_{i+1} - \Delta N_i = \frac{1}{2\tan\theta} (\lambda_2 - \lambda_1) \quad (7)$$

The formula (7) indicates that when the wavelength is changed to approximate $\lambda_1$ to $\lambda_2$, the deviation between the peak points of the dark areas of the interference fringes is uniquely defined by a focussing magnification m, the inclination $\theta$ of the slider and the wavelengths $\lambda_1$ and $\lambda_2$. When $i=0$, the spacing is zero and the formula (7) is expressed as $$\Delta N_i = \frac{1}{\tan\theta} \cdot \frac{(\lambda_2 - \lambda_1)}{2} \cdot i \quad (8)$$

Thus, by measuring the peak points of the dark areas of the interference fringes for two wavelengths and detecting the devitation, the order $i$ can be determined by the following formula.

$$2\tan\theta \cdot \frac{\Delta N_i}{\lambda_2 - \lambda_1} = i \quad (9)$$

FIG. 3c shows the increase of the deviation $(\lambda_2 - \lambda_1)/2$ for each order. It is seen that the deviation increases by $(\lambda_2 - \lambda_1)/2$ times the order $i$.

For example, when the order $i$ is 1, $h_{min}$ and $h_{max}$ can be determined from the formulas (2) and (3) by an external insertion method.

$$\begin{cases} h_{min} = \frac{h_1 X_2 - h_2 X_1}{X_2 - X_1} \\ h_{max} = h_{min} + N_L \cdot \tan\theta \end{cases} \quad (10)$$

Figure 4A:
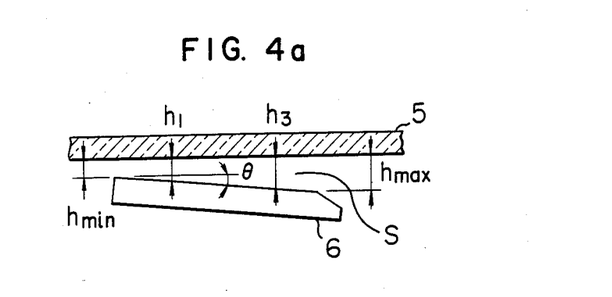
FIGS. 4a, 4b and 4c illustrate a lower limit of a measuring range of the spacing.
Figure 4B:
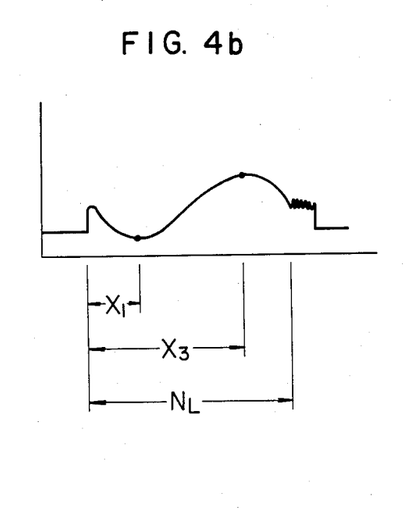
Figure 4C:
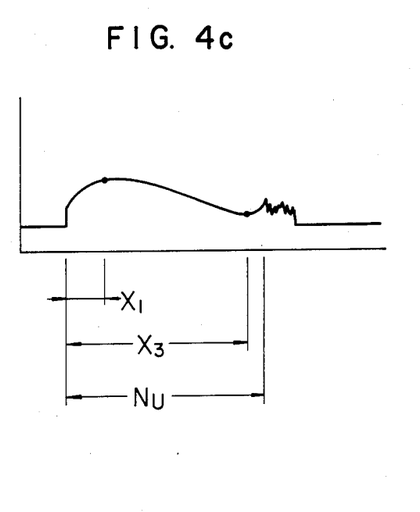

By using the peak points of both light areas and dark areas, more information is obtained and a precision is increased. A lower limit of the measuring range of the spacing can be defined. FIGS. 4a, 4b and 4c illustrate calculation therefor. In a clearance S between the glass disc 5 and the slider 6 shown in FIG. 4a, the following relation is met $$\frac{h_3 - h_{min}}{h_1 - h_{min}} = \frac{X_3}{X_1}$$

where $X_1$ is a distance of a pixel from a dark edge and $X_3$ is a distance of a pixel from a light edge as shown in FIGS. 4b and 4c. Thus, $$\begin{cases} h_{min} = \frac{X_3 h_1 - X_1 h_3}{X_3 - X_1} \\ h_{max} = h_{min} + N_L \tan\theta \end{cases} \quad (11)$$

where $$\tan\theta = \frac{\lambda}{4(X_3 - X_1)}$$

Accordingly, under the external insertion method, the spacing of the slider can be measured if at least one interference fringe is generated for each of the light area and the dark area. When the wavelength $\lambda$ is used, the inclination angle may be $\lambda/4N_L$ and a minimum spacing is equal to $\frac{1}{4}\lambda$ (0-th order light area). (See FIG. 4c)

In the embodiment of FIG. 1, one of the following noise reduction processings is carried out for the electrical signal after the image scan.

(1) Smoothing $$[I(n-2)+I(n-1)+I(n)+I(n+1)+I(n+2)]/5$$

(2) Weighted smoothing $$I(n-2)+2I(n-1)+3I(n)+2I(n+1)+I(n+2)$$

(3) Fast Fourier Transform (FFT)

These are carried out by the processing unit 32. The noise reduction processing is carried out as the preprocessing to the edge detection and the peak point detection.

Figure 5:
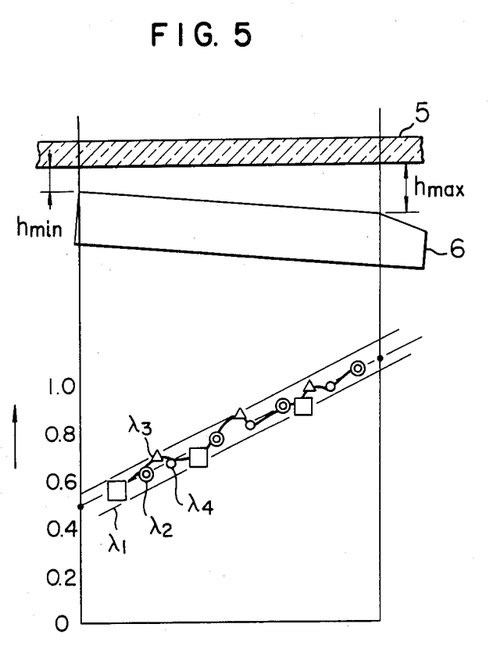
FIG. 5 shows another embodiment of the present invention.

In the above example, when the orders of the wavelengths $\lambda_1$ and $\lambda_2$ are given, the peak positions of the light areas and the dark areas of the interference fringes on the slider surface are uniquely determined. For example, for the glass disc 5 and the slider 6 shown in FIG. 5, the spacing at the peak point for the wavelength $\lambda_1$ is determined by a mark □. Similarily, the float distances for the wavelengths $\lambda_2$, $\lambda_3$ and $\lambda_4$ are determined by symbols ◎, △, and ○, respectively. Those spacings are distances at the peak points of the interference fringes and are not affected by the variations in the relection coefficients of the slider 6 and the glass disc 5. As shown in FIG. 5, the spacings for various wavelengths show a distribution of the surface contour of the slider 6. By detecting the peak points of the light areas and the dark areas of the interference fringes by different wavelengths, the surface contour of the slider 6 can be detected. A curve which connects the respective points presents a sectional plane curve at the scan position. By sequentially connecting other scan positions, a three-dimension surface contour can be measured. This indicates that the present measuring apparatus can be used to detect defect or unevenness on a surface of an article under test.

Figure 6:
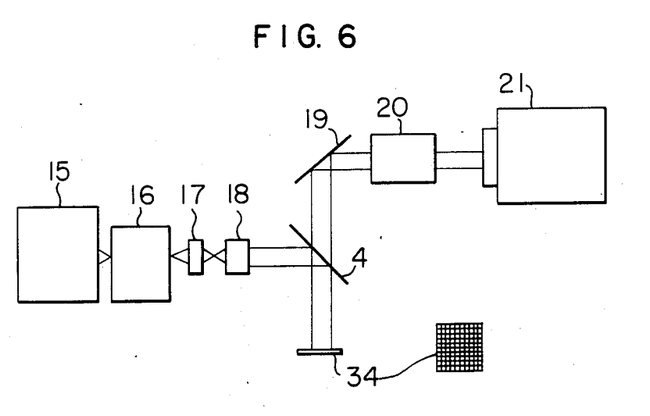
FIG. 6 shows a major portion of other embodiment of the present invention.

A fourth embodiment is now explained with reference to FIG. 6. A standard scale 34 instead of the slider 6 is focused on the photo-electric converter 21 and coordinates of grids are measured to prepare a correction table. The values in the correction table are determined while taking the shading of the photo-electric converter 21 and the distortion of the optical system into consideration. Accordingly, one frame image focused on the photo-electric converter 21 is located at a position corresponding to the distortion for each point in the 512×480 address spaces. If the precision of the square grid is sufficiently high, the distortion can be corrected based on the standard scale 34. By calculating the spacing while correcting the edge portion of the slider and the peak point of the interference fringe by the correction table, a high precision measurement is attained.

An automatic measurement by the above embodiment is attained in the following manner.

(1) The optical distortion and the image distortion are previously measured and the correction table is prepared in the processing unit.

(2) The image scan position (e.g. Ny in FIG. 2b) is previously set or it is determined by the Y direction image scan.

(3) The edge and the peak of the light area are detected based on the electrical signal for the interference fringe. It is carried out for different wavelengths.

(4) The order is determined and the float distance is calculated.

(5) The result is outputted.

Figure 7:
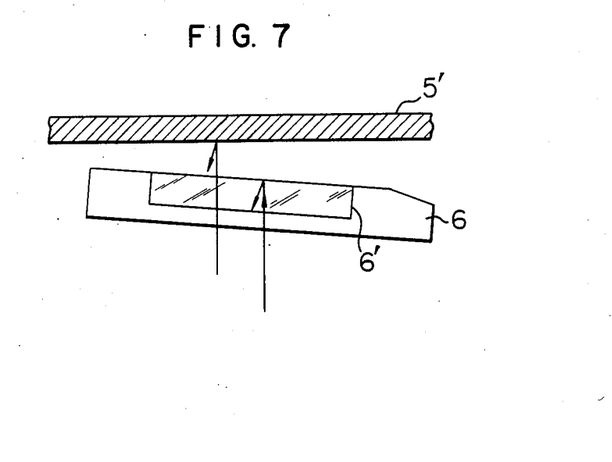
FIG. 7 shows a major portion of a further embodiment of the present invention.

In the above embodiment, the dummy disc 5 is made of transparent material and the light flux is impinged to the surface of the slider 6 through the dummy disc 5. Alternatively, the slider 6 may be made of transparent material and the light flux may be impinged to the surface of the dummy disc 5 through the slider 6 to form the interference light. Thus, at least one of the two articles which form the fine clearance may be transparent. As shown in FIG. 7, a transparent member 6' may be attached to a side of the slider 6 and the light flux may be impinged to the dummy disc 5' through the transparent member 6'.

In the above embodiment, the fine clearance between two articles is measured. The measuring apparatus of the present invention is also applicable to the measurement of a small film thickness of liquid such as a lubricant film thickness. The present invention is also applicable to the measurement is also applicable to the measurement of a fine clearance at a meshed area of gear teeth and the eccentricity of a rotating shaft.

As described herein above, according to the present invention, the fine clearance between two articles can be precisely measured and the surface contour of the article can be measured. Since the measurement is automatic, the measurement time is significantly shortened and the measurement of the fine clearance is speeded up.

We claim:

1. An apparatus for measuring a clearance between two articles, at least one of said two articles having a transparent portion, comprising:
    optical means for applying light of variable wavelength to said clearance through said transparent portion in said one article;
    means for focusing a reflection light including information of an interference fringe pattern from a surface plane of said clearance;
    photo-electric conversion means for photo-electrically converting a light intensity distribution on the focusing plane of said reflection light to form a photo-electrically converted plane corresponding to said focusing plane;
    means for scanning an interference fringe pattern on said photo-electrically converted plane formed by said photo-electric conversion means to produce an electrical signal representing the interference fringe pattern;
    means connected to said optical means, for altering the wavelength of said variable-wavelength light, so as to enable said scanning means to produce electrical signals representing respective interference fringe patterns produced by different wavelengths; and
    processing means for detecting positions of the interference fringe patterns based on said electrical signals to determine the order of a peak point of either one of said interference fringe patterns on the basis of a difference in positions of the interference fringe patterns, to thereby calculate a value of the clearance between said two articles.

2. An apparatus for measuring a clearance according to claim 1 further comprising:

means connected to said electrical signal producing means for converting said electrical signal to a digital signal; and memory means connected between said digital conversion means and said processing means for storing the converted digital signal.

3. An apparatus for measuring a spacing according to claim 1, wherein said processing means determines the order of a peak point on the basis of an equation, $$2\tan\theta \cdot \frac{\Delta N_i}{(\lambda_2 - \lambda_1)} = i,$$

where i is the order to be determined, $\theta$ is an inclination angle at the clearance between two articles, $\lambda_1$ and $\lambda_2$ are the different wavelengths of the light, and $\Delta N_i$ is a distance between the peak points of the same order i in the different interference fringe patterns.

4. An apparatus for measuring a spacing according to claim 3, wherein said processing means determines the inclination angle $\theta$ on the basis of an equation, $$\tan\theta = \frac{\lambda}{2(X_{j+1} - X_j)},$$

where $\lambda$ is either one of the different wavelengths, and $(X_{j+1} - X_j)$ is a distance between peak points of orders $(j+1)$ and j in the interference fringe pattern produced by the light of the wavelength $\lambda$.

5. An apparatus for measuring a spacing between a slider for mounting a magnetic head thereon of an information storage device and an information storage medium of the information storage device on the basis of information of a position difference between two-dimensional interference fringe patterns, by substituting an optically transparent member for one of said slider and said information storage medium to create said interference fringe patterns by using an optical interference method, comprising:

optical means for applying a light flux of variable wavelength to the spacing between said slider and said medium;

focusing means for focusing a reflection light from said spacing as an interference image;

photo-electric conversion means for detecting a light intensity on the focusing plane;

means for scanning the interference image on the photo-electric conversion plane so as to produce an electrical signal;

means for sampling the electrical signal after the scan and converting a sampled signal to a digital signal;

means for storing the converted digital signal for each of different interference images which are produced by light fluxes of different wavelengths applied from said optical means; and means for processing the stored digital signals of the different interference images to determine the order of a peak point of either one of said interference fringe patterns.

6. An apparatus for measuring a spacing according to claim 5, wherein said processing means determines the order of a peak point on the basis of an equation, $$2\tan\theta \cdot \frac{\Delta N_i}{(\lambda_2 - \lambda_1)} = i,$$

where i is the order to be determined, $\theta$ is an inclination angle at the clearance between said two articles, $\lambda_1$ and $\lambda_2$ are different wavelengths of the light, and $\Delta N_i$ is a distance between the peak points of the same order i in the different interference fringe patterns.

7. An apparatus for measuring a spacing according to claim 6, wherein said processing means determines the inclination angle $\theta$ on the basis of an equation, $$\tan\theta = \frac{\lambda}{2(X_{j+1} - X_j)},$$

where $\lambda$ is either one of the different wavelengths, and $(X_{j+1} - X_j)$ is a distance between peak points of orders $(j+1)$ and j in the interference fringe pattern produced by the light of the wavelength $\lambda$.

8. An apparatus for measuring a spacing according to claim 5, wherein said optical means includes means for converting an output light flux from a light source to a monochromatic light, and means for sequentially changing a wavelength of said monochromatic light; said focusing means including means for focusing a light interference image at each wavelength onto said photoelectric conversion means; and said processing means includes means for detecting a contour of said slider and peak positions of light and dark areas of said interference fringe pattern based on the electrical signal after the scan, and means for simultaneously determining a value of the spacing of said slider from said medium and the surface contour of said slider based on the signals from said detection means.

9. An apparatus for measuring a spacing according to claim 5 further comprising:

noise reduction smoothing means for the electrical signal; and means for reshaping the electrical signal from said noise reduction smoothing means, the signal from said reshaping means being processed by said processing means to determine the spacing by detecting the contour of the slider and the peak points of light and dark areas of the interference fringe pattern.

10. An apparatus for measuring a spacing according to claim 9, wherein said optical means includes means for converting an output light flux from a light source to a monochromatic light, and means for sequentially changing a wavelength of said monochromatic light; said focusing means including means for focusing a light interference image at each wavelength onto said photoelectric conversion means; and said processing means includes means for detecting a contour of said slider and peak positions of light and dark areas of said interference fringe pattern based on the electrical signal after the scan, and means for simultaneously determining a value of the spacing of said slider from said medium and the surface contour of said slider based on the signals from said detection means.

* * * * *